(12) United States Patent
Winkler et al.

(10) Patent No.: US 8,662,836 B2
(45) Date of Patent: Mar. 4, 2014

(54) CHARGING DEVICE

(75) Inventors: Gunter Winkler, Stuttgart (DE); Florian Rentz, Stuttgart (DE); Tobias Dettmann, Rüterberg (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 573 days.

(21) Appl. No.: 12/965,436

(22) Filed: Dec. 10, 2010

(65) Prior Publication Data

US 2011/0142600 A1 Jun. 16, 2011

(30) Foreign Application Priority Data

Dec. 11, 2009 (DE) .................. 10 2009 057 987

(51) Int. Cl.
*F04D 29/30* (2006.01)
(52) U.S. Cl.
USPC .......................................... 415/191; 416/235
(58) Field of Classification Search
USPC ........ 415/185, 186, 191, 208.1, 208.2, 208.3, 415/151, 155, 159, 158, 160, 163, 164, 415/165; 416/205, 228, 231 R, 235
See application file for complete search history.

(56) References Cited

U.S. PATENT DOCUMENTS

| 5,372,485 | A | * | 12/1994 | Sumser et al. ............... 417/407 |
| 6,358,012 | B1 | * | 3/2002 | Staubach ...................... 416/228 |
| 6,709,232 | B1 | | 3/2004 | Vogiatzis |
| 7,413,401 | B2 | * | 8/2008 | Szucs et al. .................... 415/162 |
| 2004/0091360 | A1 | * | 5/2004 | Yamawaki ..................... 416/235 |
| 2005/0047919 | A1 | * | 3/2005 | Nussbaum et al. ............ 416/235 |
| 2008/0279692 | A1 | * | 11/2008 | Karamavruc et al. ......... 416/237 |

FOREIGN PATENT DOCUMENTS

| DE | 430487 | 9/1993 |
| DE | 4220960 A1 | 1/1994 |
| DE | 4238550 A1 | 5/1994 |
| DE | 102007058962 A1 | 6/2009 |
| EP | 0056669 A1 | 7/1982 |
| WO | WO 2005064121 A1 * | 7/2005 .............. F01D 17/16 |
| WO | WO-2009/086959 A1 | 7/2009 |

OTHER PUBLICATIONS

Search report for DE102009057987.7, Oct. 19, 2010.
English abstract for DE-102007058962, Jun. 10, 2009.
English abstract for DE-4220960, Jan. 5, 1994.
English abstract for DE-4238550, May 19, 1994.
English abstract for EP-0056669, Jul. 28, 1982.

\* cited by examiner

*Primary Examiner* — Edward Look
*Assistant Examiner* — William Grigos
(74) *Attorney, Agent, or Firm* — Rader, Fishman & Grauer PLLC

(57) ABSTRACT

An exhaust gas turbocharger, including either a variable turbine with rotatably mounted guide vanes or a compressor geometry with rotatably mounted guide vanes. At least one of the guide vanes has a profile center line with at least one of a jump and a kink.

15 Claims, 1 Drawing Sheet

CHARGING DEVICE

CROSS-REFERENCES TO RELATED APPLICATION

This application claims priority to German patent application DE 10 2009 057 987.7 filed on Dec. 11, 2009, which is hereby incorporated by reference in its entirety.

TECHNICAL FIELD

The present invention relates to a charging device, more preferably an exhaust gas turbocharger for a motor vehicle, with a variable turbine and/or compressor geometry according to the preamble of claim 1. The invention additionally relates to a guide vane for such a charging device.

BACKGROUND

Charging devices with so-called variable turbine geometries are becoming increasingly widespread in order to be able to better adapt the power output and the response characteristics to different operating conditions such as for example load changes. To this end, the variable turbine geometry has adjustable and non-rotating guide vanes in the turbine inlet or in a housing. For thermodynamic efficiency, a regulating characteristic and required radial installation space, the shape of the guide vane profile is decisive, while the shape of the guide vane as a rule is described via the so-called profile centre line (curvature line) which runs between the centre point of the head radius and the centre point of the end radius of the guide vane. The profile centre line is determined by placing circles which are tangential to the top and bottom within the profile of the guide vane, wherein the centre points of these circles describe the profile centre line.

From U.S. Pat. No. 6,709,232 B1 a generic charging device with rotatably mounted guide vanes for a variable turbine geometry is known. There, the known guide vanes have a continuous profile centre line.

SUMMARY

The present invention deals with the problem of stating an improved or at least an alternative embodiment for a charging device of the generic type, which more preferably is more favourable in terms of flow in the region of a variable turbine geometry.

According to the invention, this problem is solved through the subjects of the independent claims. Advantageous embodiments are the subject of the dependent claims.

The invention is based on the general idea of no longer configuring guide vanes for a variable turbine and/or compressor geometry of a charging device with a continuous profile centre line as has been known up to now from the prior art, but with a profile centre line that at least comprises a jump or a kink. This has the advantage that an opening characteristic of a variable turbine/compressor geometry equipped with such guide vanes can be improved without having to accept disadvantages in terms of the efficiency. At the same time, flow characteristics can be clearly improved with a guide vane having a jump, a step or a kink in its profile centre line, as a result of which improved efficiency can also be achieved. Further advantages of a guide vane thus equipped consist in a preferentially unchanged regulating characteristic and an installation space requirement that remains the same. A guide vane with a profile centre line according to the invention naturally does not have a continuous surface but in accordance with the step or the kink or the jump in the profile centre line also has a corresponding discontinuity on the surface subjected to the flow. However, surprisingly and contrary to previous assumptions, this rather has a favourable than an unfavourable flow effect. Above all, such shapes of the guide vanes require a smaller opening moment as a result of which reduced actuation forces and for example also a smaller actuating device, that is an actuating device of smaller dimensions, is required.

Further important features and advantages of the invention are obtained from the subclaims, from the drawings and from the corresponding figure description by means of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWING

Preferred exemplary embodiments of the invention are shown in the drawings and are explained in more detail in the following description, wherein same reference characters relate to same or similar or functionally same components.

There it shows, in each case schematically.

DETAILED DESCRIPTION

Figure 1:
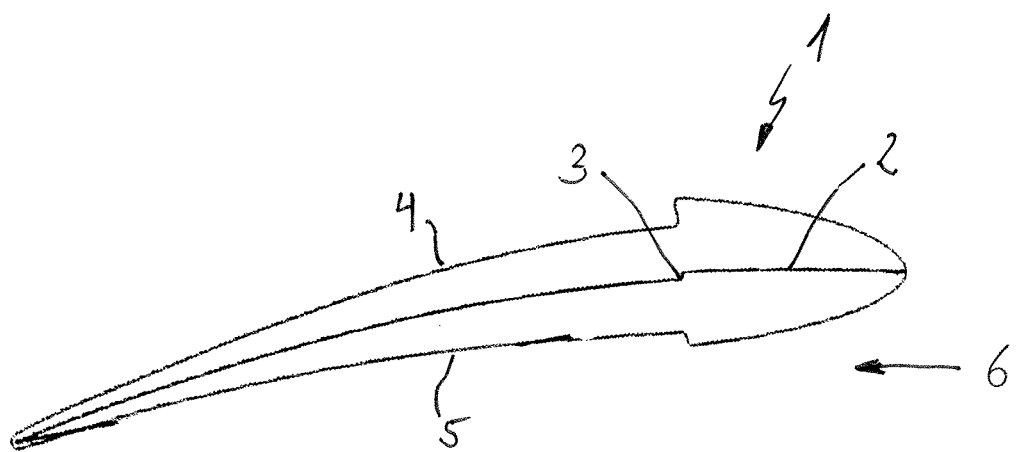
FIG. 1 a cross-sectional profile through a guide vane according to the invention with a profile centre line having a jump, FIG. 2 a representation as in FIG. 1 however with a profile centre line having two jumps.
Figure 2:
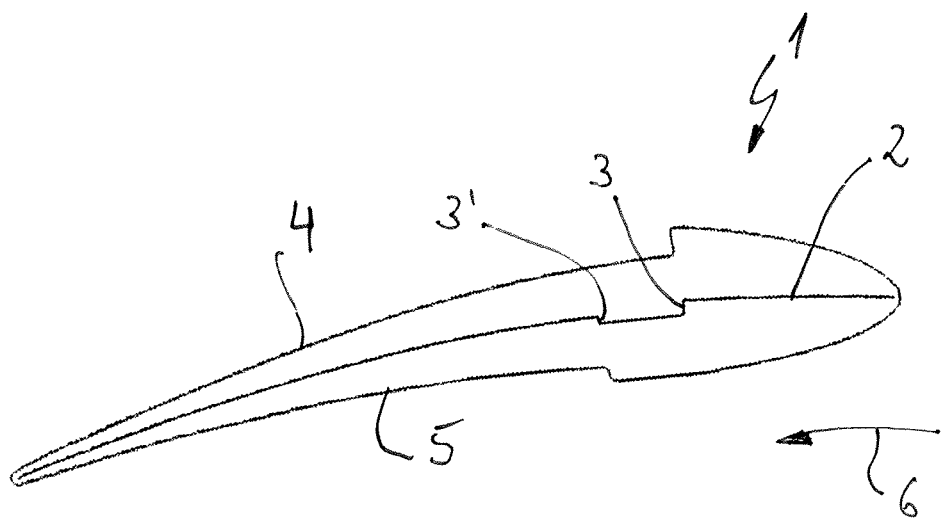

According to FIGS. 1 and 2 a guide vane 1 according to the invention, which for example can be used in the region of a variable turbine and/or compressor geometry of a charging device, more preferably of an exhaust gas turbocharger in a motor vehicle, has a profile centre line 2 with at least 1 jump 3, 3' or a kink. According to FIG. 1, the profile centre line 2, also called curvature line, in this case has a single jump 3 which is formed in the way of a step and which both on a top 4 as well as a bottom 5 of the guide vane 1 brings about a discontinuity/offset on the respective surface. Depending on the size of the step or the jump 3 of the profile centre line 2 the size of the offset arranged on the respective surface of the top 4 and/or the bottom 5 differs. With the guide vane 1 shown according to FIG. 1 the jump 3 is designed in such a manner that the profile of the guide vane 1 tapers in flow direction 6. There, the taper occurs at the same height in flow direction 6 both on the top 4 as well as on the bottom 5.

According to FIG. 2, the guide vane 1 shown there has a profile centre line 2 with two jumps or steps 3, 3', wherein the first jump 3 is designed in such a manner that it merely results in a discontinuity of the surface on the top 4 of the guide vane 1, whereas it does not result in any discontinuity of the surface on the bottom 5 of the guide vane 1 in the region of the jump 3. Considering the profile centre line 2 of the guide vane 1 shown according to FIG. 2 it is evident that the two jumps 3, 3' are directed in opposite directions, i.e. in flow direction 6 initially a step 3 down and then a step 3' up are provided. The second jump 3' exclusively results in a discontinuity of the surface on the bottom 5, whereas it does not cause any discontinuity of the surface on the top 4 of the guide vane 1. The guide vane 1 can be undivided, that means, that the guide vane 1 is made in one part or in one piece.

In general, the profile centre line 2 can have a straight or a curved shape so that the profile centre line 2 is designed stepped or kinked exclusively in the region of the jump or of the jumps 3, 3'.

With a guide vane 1 configured thus, technical flow advantages can more preferably be achieved, while an opening moment of the guide vane can be reduced at the same time. Such an opening moment has to be generated for example for opening a variable turbine or compressor geometry composed of such guide vanes 1 by means of an actuating device in order to achieve a higher through-flow. With the guide vane 1 configured according to the invention it is thus more preferably possible to reduce an opening moment without negatively influencing the efficiency, a regulating characteristic or an installation space requirement.

Obviously, the individual continuous regions of the profile centre line 2 adjoining the respective jump or jumps 3, 3' can be identically, equally or similarly configured, namely more preferably with respect to their length and/or curvature.

LIST OF REFERENCE NUMBERS

1 Guide vane
2 Profile centre line
3 Jump, kink/discontinuity
4 Top of the guide vane 1
5 Bottom of the guide vane 1

The invention claimed is:

1. An exhaust gas turbocharger, comprising: at least one of a variable turbine with rotatably mounted guide vanes and a compressor geometry with rotatably mounted guide vanes, wherein at least one of the guide vanes has a profile centre line with at least one of an at least one jump and at least one kink, wherein the profile centre line has at least two jumps directed in opposite directions and wherein at least one of the guide vanes has a discontinuous profile centre line.

2. The exhaust gas turbocharger-device according to claim 1, wherein at least one of the guide vanes adjacent to the at least one of the jump and the kink has a region with at least one of a continuous and a steady profile centre line.

3. The exhaust gas turbocharger device according to claim 2, wherein the at least one region with a continuous profile centre line has at least one of a curved and a straight profile centre line.

4. The exhaust gas turbocharger device according to claim 1, wherein the guide vane is made in at least one of an undivided single part and an undivided single piece.

5. The exhaust gas turbocharger according to claim 1, wherein at least one of the guide vanes has a profile centre line with at least two kinks, which are directed in opposite directions.

6. An exhaust gas turbocharger guide vane, comprising: a profile centre line having at least one at least one jump and at least one kink, wherein the profile centre line has at least two jumps directed in opposite directions and wherein at least one of the guide vanes has a discontinuous profile centre line.

7. The exhaust gas turbocharger guide vane according to claim 6, wherein the guide vane is undivided, and is made of at least one part and one piece.

8. The exhaust gas turbocharger guide vane according to claim 6, wherein at least one of the guide vanes has a profile centre line with at least two kinks, which are directed in opposite directions.

9. The exhaust gas turbocharger guide vane according to claim 6, wherein at least one of the guide vanes adjacent to the at least one of the jump and the kink has a region with at least one of a continuous and a steady profile centre line.

10. The exhaust gas turbocharger guide vane according to claim 9, wherein the at least one region with a continuous profile centre line has at least one of a curved and a straight profile centre line.

11. The exhaust gas turbocharger guide vane according to claim 6, wherein the guide vane is made in at least one of an undivided single part and an undivided single piece.

12. An exhaust gas turbocharger, comprising: at least one compressor having at least one rotatably mounted guide vane, wherein at least one of the at least one guide vanes has a profile centre line with at least one of a jump and a kink, and wherein at least one of the jump and the kink is directed in opposite directions and wherein at least one of the guide vanes has a discontinuous profile centre line.

13. The exhaust gas turbocharger device according to claim 12, wherein at least one of the guide vanes adjacent to the at least one of the jump and the kink has a region with at least one of a continuous and a steady profile centre line.

14. The exhaust gas turbocharger device according to claim 13, wherein the at least one region with a continuous profile centre line has at least one of a curved and a straight profile centre line.

15. The exhaust gas turbocharger device according to claim 12, wherein the guide vane is made in at least one of an undivided single part and an undivided single piece.

* * * * *